L. P. HOLT.
AUTOMOBILE CURTAIN.
APPLICATION FILED FEB. 10, 1917.
1,281,571.
Patented Oct. 15, 1918.
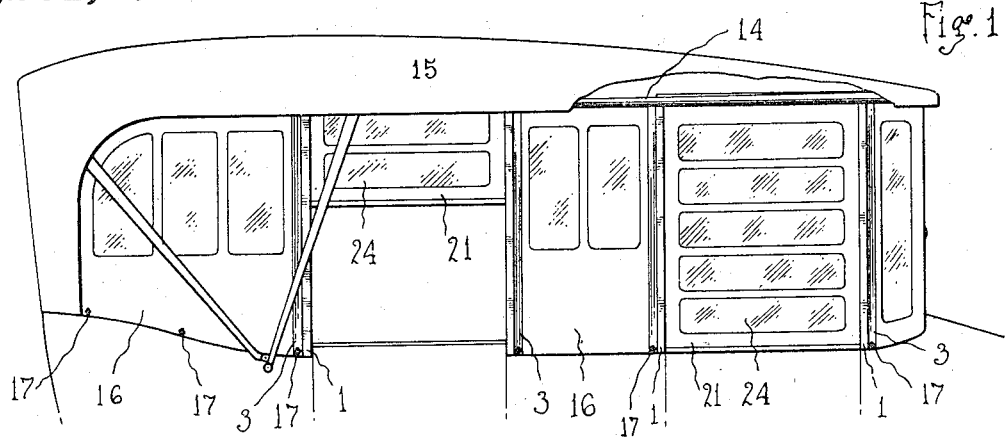
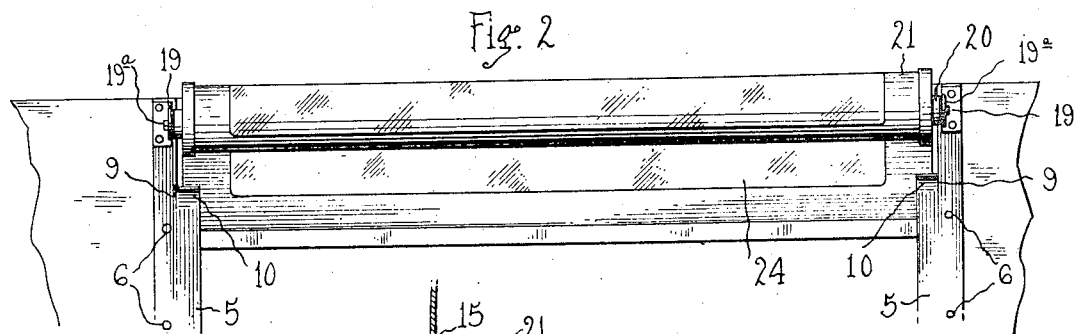
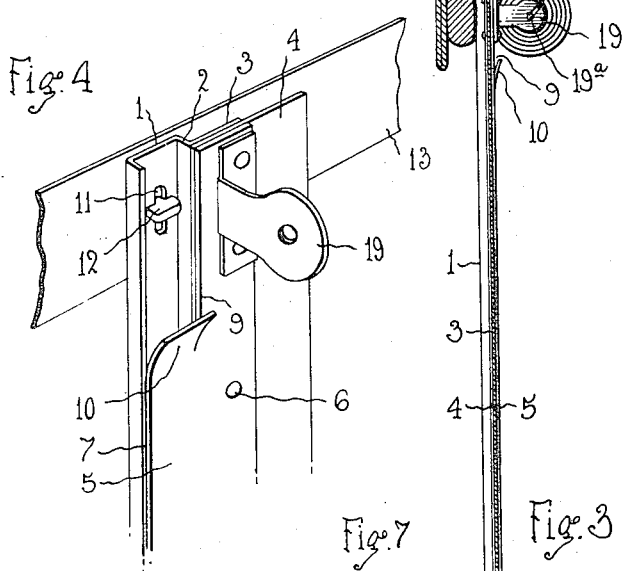
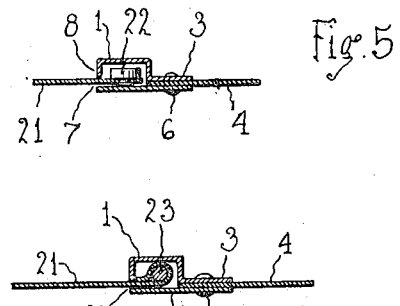
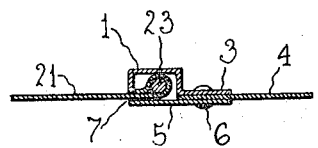
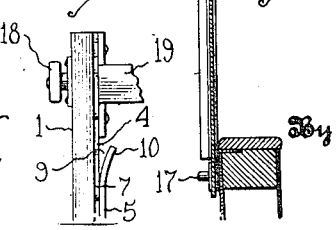
Inventor
Luther P. Holt
Witnesses
Arthur F. Draper
Karl H. Butler
Attorneys

UNITED STATES PATENT OFFICE.

LUTHER P. HOLT, OF PORT HURON, MICHIGAN.

AUTOMOBILE-CURTAIN.

1,281,571.  Specification of Letters Patent.  Patented Oct. 15, 1918.

Application filed February 10, 1917. Serial No. 147,921.

*To all whom it may concern:*

Be it known that I, LUTHER P. HOLT, a citizen of the United States of America, residing at Port Huron, in the county of St. Clair and State of Michigan, have invented certain new and useful Improvements in Automobile-Curtains, of which the following is a specification, reference being had therein to the accompanying drawings.

This invention relates to automobile curtains, and has special reference to side and storm curtains which will coöperate with a top in providing an inclosure for the occupants of an automobile body.

The primary object of my invention is to provide novel, panel strips that will serve as supports for a curtain shade roller having a curtain or rollable panel that may be used at the doors of the automobile body, to coöperate with side curtain or panels in providing a complete inclosure for the occupants of the automobile. The panel strips are constructed to serve as guides for the side edges of the curtains or rollable panels, and the strips are also made whereby they may be easily and quickly installed or attached to side panels or curtains now in use.

A further object of my invention is to accomplish the above results by a simple, durable, inexpensive and mechanical construction that will be hereinafter specifically described and then claimed, and reference will now be had to the drawings, wherein—

Figure 1 is a side elevation of a portion of an automobile body provided with panel strips and door curtains in accordance with my invention;

Fig. 2 is an enlarged elevation of a curtain shade roller supported by panel strips;

Fig. 3 is a cross sectional view of a panel strip;

Fig. 4 is a perspective view of a portion of the same;

Fig. 5 is a horizontal sectional view of a portion of the strip;

Fig. 6 is a similar view illustrating a slight modification of the strip, and

Fig. 7 is an edge view of the panel strip showing a button thereof.

A panel strip in accordance with my invention comprises a channel member 1 having one of the side walls 2 thereof provided with a longitudinal flange 3 set in a plane parallel with the back of the channel member 1. On the flange 3 is placed a flexible connecting member 4 and this flexible connecting member is retained on the flange 3 by a closure plate 5 riveted or otherwise connected to the flange 3, as at 6. The connecting member 4 spaces the closure plate 5 relative to the channel member 1, and closes said channel member, with the exception of the ends thereof and a longitudinal slot 7 formed by the other side wall 8 of the channel member 1 and the closure plate 5. The upper end of the closure plate 5 is slitted, as at 9, and a portion 10 thereof bent outwardly, so that easy access can be had to the upper end of said member. The back of the channel member 1 has a slot 11 adapted to receive a turn button 12 carried by a top strip 13 or a horizontal bow 14 of an automobile top 15. The strip 13 or the bow 14 are common in connection with a great many foldable automobile tops, and such a top has been illustrated in Fig. 1 as having side curtains or panels 16. The side curtains or panels are generally held in position by turn buttons 17 and the lower end of the panel strip may be held by one of said buttons engaging the connecting member 4 of the strip. It is therefore possible to manufacture the panel strip independent of panels, and then furnish the same to the manufacturers of panels, so that the connecting members 4 may be sewed or otherwise attached to those edges of the panel 16 in proximity to the doorway of the automobile. In some instances, the panel strip may be provided with turn buttons 18, as shown in Fig. 7, so that the panel strip can be buttoned to the lining of an automobile top or any other suitable support.

The upper end of each panel strip has a bracket 19, and the brackets of a pair of panel strips coöperate in supporting the pintles 19ᵃ of a curtain shade roller 20, said curtain shade roller being of a conventional form having springs for winding a curtain thereon. Attached to the curtain shade roller 20 and adapted to be wound thereon is a curtain or rollable panel 21 and the side edges of this rollable panel are adapted to extend into the slots 7 of the panel strips and be guided thereby. The side edges of the rollable panel may be provided with a series of buttons 22 or a corded or beaded edge 23. In either instance, the buttons or corded edges are adapted to extend into the channel member and prevent lateral displacement of the curtain or panel relative to the side strip. The open upper ends of the panel strips facilitate placing the end of the door curtain or rollable panel in position that the side edges thereof may move in the channel members; and when the curtains or rollable panels are lowered to the upper edge of the door of the automobile body, to coöperate with the other side curtains or panels in providing a secure and reliable inclosure for the occupants of the automobile body. It is practically impossible for wind or the forces of nature to get under the side edges of the rollable panel and with the panel strips connected to the ordinary panels an inclosure is formed; the forces of nature are excluded, and observations may be made through the usual transparent or celluloid inserts 24.

When the side curtains or panels are not in use the curtain shade rollers for the door curtains or panels may be removed, the side curtains or panels rolled on the panel strips, and all placed beneath a seat or in a place convenient for use.

The metallic parts of the panel strip may be finished to harmonize with other metallic fittings of the automobile body or top, and while in the drawings there are illustrated the preferred embodiments of my invention, it is to be understood that the structural elements are susceptible to such variations and modifications as fall within the scope of the appended claim.

What I claim is:—

The combination of panels, a strip attached to each panel and adapted to have its ends detachably connected to an automobile top and body and adapted when detached to serve as a core about which said panel may be wrapped, each strip comprising a channel member, a closure plate thereon coöperating with said member in providing a slot and holding said panel in permanent engagement therewith, a curtain shade roller adapted to be supported between two of said members at the upper ends thereof, and a curtain on said curtain shade roller having the side edges thereof extending into the slots of said channel members.

In testimony whereof I affix my signature in the presence of two witnesses.

LUTHER P. HOLT.

Witnesses:
KARL H. BUTLER,
ANNA M. DORR.